United States Patent Office 3,512,640
Patented May 19, 1970

---

3,512,640
COUNTERCURRENT SOLID-LIQUID CONTACTING SYSTEM
Joseph B. Hellmann, Queens Village, N.Y., assignor to American Standard Inc., a corporation of Delaware
Filed Oct. 18, 1967, Ser. No. 676,180
Int. Cl. B01d *33/20*
U.S. Cl. 210—80               17 Claims

ABSTRACT OF THE DISCLOSURE

This invention relates to method and apparatus for countercurrent contact between a liquid stream and a bed of solid particles. It is specifically applicable to the use of a bed of powdered or granular coal for the filtration of sewage and industrial liquid wastes. However, the invention is and should be generally applicable for other countercurrent liquid-solid processes, such as the filtration of water for municipal or industrial water supply through a bed of sand, or the continuous softening of water with ion exchange resins.

Figure 1:
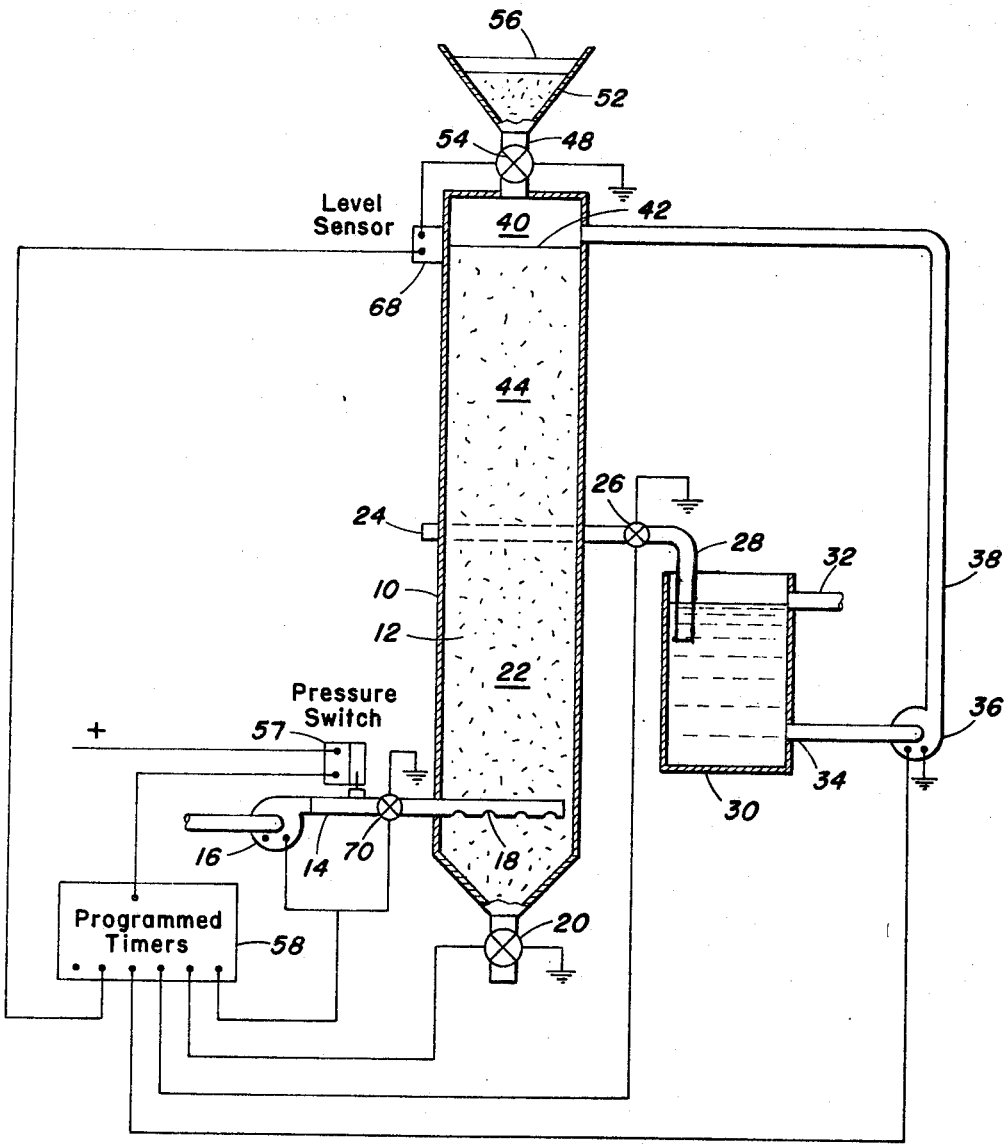

The principal object of the invention is to provide a method and apparatus wherein a liquid-contacting bed can be maintained in a solidly packed condition, and wherein the bed can be periodically replenished by exhausting spent bed material from the lower surface of the bed and adding new bed material to the upper surface of the bed.

CROSS-REFERENCES TO RELATED APPLICATIONS

Several other related patent applications are being filed concurrently or substantially concurrently herewith. Those applications are identified as follows: R. S. Bevans, Ser. No. 676,193, filed Oct. 18, 1967; R. S. Bevans, Ser. No. 676,266, filed Oct. 18, 1967; I. J. Kugelman, Ser. No. 676,192, filed Oct. 18, 1967; and I. J. Kugelman et al., Ser. No. 676,167, filed Oct. 18, 1967.

BACKGROUND OF THE INVENTION

This invention was developed to provide means and a method for the filtration of liquids containing a high concentration of suspended solids, such as sewage and various trade wastes, the filtration to be performed in a bed of closely packed granular particles, such as powdered coal or sand. Attempts to use stationary bed filters of closely packed granular particles for the filtration of such liquids have not been successful. These filters are at best limited to applications where the liquid contains a low concentration of suspended solids. The limitation on stationary bed filters results from the need to periodically shut down the filter and cleanse it when it becomes clogged with the suspended solids removed from the liquid. Cleaning is performed by back-washing the bed in place with a portion of the treated effluent. When filtering liquids containing a high concentration of suspended solids, it has been found that the proportion of the available time expended on cleaning the filter is economically excessive and therefore the process is commercially impractical. Furthermore, it has been found that when filtering liquids containing sticky solids, such as sewage, it is quite difficult, sometimes virtually impossible to adequately cleanse the bed by standard backwash techniques.

In this invention, practical means are provided to periodically discharge clogged layers of the filtration bed, thereby cleansing the bed and making it promptly available for re-use. The time required for discharge is less than one minute compared to back wash times of 30 to 45 minutes used with stationary bed filters. Thus, this invention provides for essentially a continuous filtration process with practical and commercial potentialities.

High filtration efficiency can only be obtained in a bed of solid particles when the solids are maintained in a close packed condition. In previous suggested upow filtration systems, the flow rate of the liquid was substantially restricted so that it was less than the fluidization velocity of the bed. This was necessary because fluidization essentially destroys the close packed condition of the bed particles. In this invention, means are provided to maintain the bed in a close packed configuration even if the fluidization velocity is considerably exceeded. Thus, the flow rate of liquid to be treated through the filter arrangement of this invention is not limited by fluidization effects.

SUMMARY

This invention contemplates a method and apparatus for maintaining the solid particles of a liquid-solids contact bed in a compact configuration irrespective of the upflow velocity of the liquid moving through the bed, periodically discharging exhausted bed solids, and replenishing the exhausted bed materials with fresh solids. Compaction is accomplished by withdrawing upflowing liquid from the bed before it reaches the upper bed surface and recycling a portion of the withdrawn liquid so that it flows downward through the upper portion of the bed. This produces a downward drag force on the bed to counteract the upward drag force of the inflowing liquid. Discharge of exhausted bed solids is accomplished by producing a higher pressure in the bed than in a region outside the bed which communicates with the lower region of the bed through an interconnecting valve. When the valve is opened, the pressure differential forces bed solids to move down and eventually out of the bed. Fresh bed solids are added to the system through a valve in the upper portion of the vessel which houses the bed.

THE DRAWINGS

Figure 2:
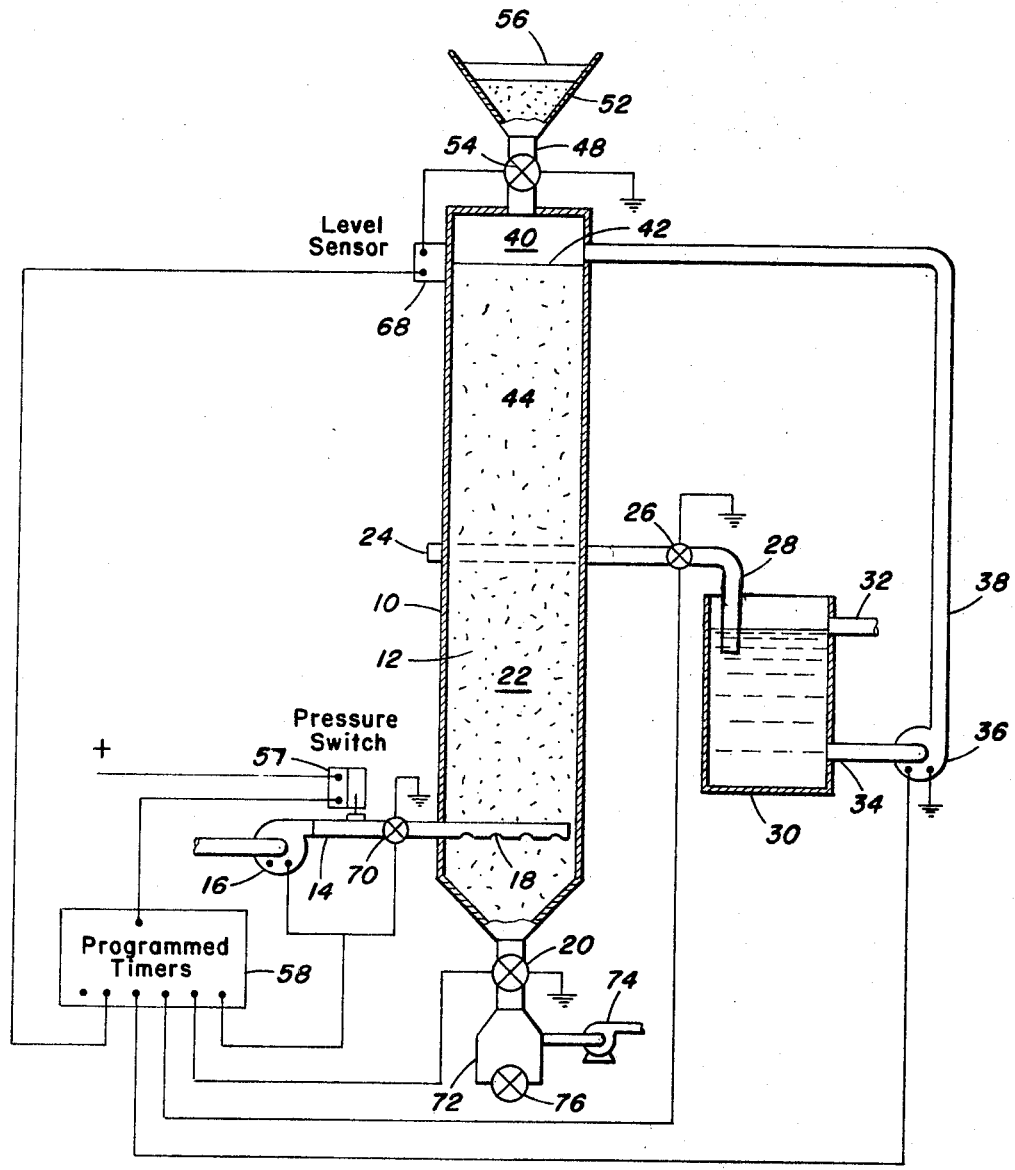

FIG. 1 is a sectional view taken through a form of apparatus embodying the invention. FIG. 2 is a sectional view taken through a second form of apparatus embodying the invention.

DESCRIPTION OF APPARATUS AND METHOD

FIG. 1 illustrates an upstanding vessel 10 containing a bed 12 of closely packed solid particles such as coal. During normal operation, the liquid to be treated, such as sewage, is fed by pump 16 into supply pipe 14 and thence into the lower portion of bed 12. Suitable perforations 18 are provided in that part of supply pipe 14 within vessel 10 to distribute the influent liquid uniformly across the cross section of bed 12. Any suitable means may be used to achieve or improve distribution of the liquid. A valve 70, which may be used to interrupt liquid flow when desired, is provided in supply pipe 14 as shown in FIG. 1.

Valve 20 in the bottom of vessel 10 is closed during normal operation so that the liquid is caused to flow upwardly through zone 22 of bed 12, in which zone filtration and/or other treatment, e.g. chemical treatment of the liquid, takes place. The liquid is then exhausted from the bed through an outlet chamber 24, which may be a screened pipe or any other suitable device which will pass the effluent liquid but prevent the escape of bed particles. Outlet chamber 24 may be positioned at any elevation between inlet pipe 14 and the top of the bed 42.

During normal operation, valve 26 in discharge pipe 28, which communicates with outlet chamber 24 and the holding tank 30 as shown, is open so that liquid exhausted from the column flows freely into holding tank 30. Holding tank 30 is equipped with a liquid outlet pipe 32 in its upper portion for the discharge of the treated liquid. A second outlet 34 in the lower portion of tank 30 communicates with the recycle pump 36, said pump discharging through a liquid line 38 into the top portion of the vessel 10. During normal operation, previously treated liquid is pumped continuously from tank 30, by means of pump 36, into the upper portion of vessel 10. As shown in FIG. 1, the recycle liquid is delivered to a confined space 40 above the upper surface 42 of bed 12. While this is the preferred arrangement, the liquid may be delivered to any position in the upper part of bed 12 provided said position is at a level above the outlet chamber 24. The recycle liquid from line 38 then flows downward through the upper part of bed 12 and exits through the aforementioned outlet chamber 24, together with the upflowing liquid from the lower portion of the bed. Alternately, the downflowing liquid may be withdrawn from bed 12 through a second non-illustrated outlet located slightly above outlet 24.

Bed 12 is thus composed of two zones of closely packed granular material: a lower zone 22 in which liquid to be treated flows upwardly during normal operation, and an upper zone 44 in which purified liquid flows downwardly during normal operation. The recycled liquid flowing downwardly through zone 44 exerts a downward drag force on the bed 12 which acts to counteract the upward drag force exerted by the upward flowing liquid in zone 22 of bed 12. The recycle flow is always set, during normal operation, so as to provide a downward drag force equal to or greater than the upward drag force, thus preventing fluidization of the bed 12. Maintenance of the bed in a compacted condition by the action of the recyled liquid is advantageous in that all mass transfer operations as well as filtration are more efficiently carried out in a compact bed than in a fluidized bed.

BED REPLENISHMENT

During normal operation, the solid particles making up the bed progressively decrease in their capacity to treat the liquid. For example, when carrying out a filtration operation, the bed will gradually clog with solids removed from the liquid and with particular reference to adsorption, the adsorption capacity of the bed particles will decrease as more and more of the adsorbate is transferred from the liquid to the solid. This effect is most marked in the bed cross section at the elevation of the supply pipe 14, because the concentration of contaminant in the liquid is greatest at this cross section. Consequently, the bed particles in the vicinity of inlet openings 18 must be periodically removed and periodically replenished. This is accomplished by creating a pressure differential between bed 12 and the external region which communicates with the bed through valve 20. When valve 20 is opened after the pressure differential is established, bed particles will move out of the base of the bed 12 into the external region of lower pressure. After valve 20 closes, new bed material is added to the upper bed surface 42 through valve 54.

In the illustrated apparatus of FIG. 1, the pressure differential is produced by de-energizing pump 16 and closing valves 70 and 26 while pump 36 continues to be energized. When sufficient pressure has been built up throughout the entire vessel 10, valve 20 is opened. With valve 20 opened to the atmosphere, the pressure within vessel 10 forces bed material to move down and out of the vessel 10 through valve 20. When a sufficient quantity of exhausted or spent bed material is removed, valve 20 is closed so that the filtration process may be continued.

The pressure differential may also be produced by other methods. For example, in the apparatus illustrated in FIG. 2, the apparatus of FIG. 1 is shown equipped with a vacuum chamber 72, which communicates with the bed 12 through valve 20. Chamber 72 is maintained under a vacuum either continuously or only during periods of bed discharge, and the vacuum is produced by vacuum pump 74. With the apparatus of FIG. 2, bed material can be removed by de-energizing pump 16 and closing valve 70 with valve 26 open. Pump 36 remains energized and chamber 72 is evacuated by pump 74. By this method, a pressure differential is produced primarily through the action of the vacuum assembly. When valve 20 is opened and vessel 10 communicates with vacuum chamber 72, the pressure differential will force bed material out of vessel 10 and into the vacuum chamber 72. When sufficient bed material has been displaced from vessel 10, valve 20 is closed.

Alternately, the pressure differential can be created by both pressurizing vessel 10 and evacuating chamber 72. For this procedure, pump 16 is de-energized, valves 70 and 26 is closed, pump 36 remains energized and chamber 72 evacuated. Again, opening valve 20 provides a path for the bed material to move out of vessel 10 (the zone of high pressure) into chamber 72 (the zone of low pressure). Chamber 72 is provided with a valve 76 to be operated when necessary to remove bed solids from the vacuum chamber 72.

Irrespective of the particular method used to create the pressure differential, the bed exhaustion or bed removal period ends when valve 20 is closed. New bed material is then added to the upper surface 42 of bed 12.

There are several methods by which new bed material can be added to vessel 10. For example, in FIGS. 1 and 2 fresh bed material is held in a hopper 52 which communicates with vessel 10 through line 48 in which is inserted a valve 54. A liquid level 56 is maintained above the fresh bed material in hopper 52. Valve 54 is maintained closed except when fresh bed material is to be added. After valve 20 closes ending the bed removal period, valve 54 is opened and valve 26 is opened if it was closed during the bed removal period. The head of liquid 56 will cause the fresh bed material in hopper 52 to discharge into vessel 10. When sufficient fresh material has passed from hopper 52 to vessel 10, valve 54 is closed and the system is returned to normal operation by energizing pump 16 and opening valve 70.

An alternate procedure is first to reestablish normal operation after valve 20 closes and then to add new bed material. Here, after valve 20 closes, valve 26 is opened, if it was closed during the bed removal period, pump 16 is energized and valve 70 is opened. Then valve 54 is opened to allow fresh bed material to enter the bed 12, and once sufficient new bed material has been added, valve 54 is closed. The second of these two procedures for bed replenishment is preferred because bed addition may be made any time during normal operation.

The table below summarizes the conditions of the pumps and valves of this invention during various phases of operation.

| Control device | Normal operation | Bed removal | | | Bed addition | |
| --- | --- | --- | --- | --- | --- | --- |
| | | Pressure alone | Vacuum alone | Pressure and vacuum | Prior to normal oper. | During normal oper. |
| Pump 16 | On | Off | Off | Off | Off | On. |
| Valve 70 | Open | Closed | Closed | Closed | Off | Open. |
| Valve 26 | do | do | Open | do | Open | Do. |
| Pump 36 | On | On | On | On | On | On. |
| Valve 20 | Closed | Open | Open | Open | Closed | Closed. |
| Vacuum pump 74 | On or off | | On | On | On or off | On off. |
| Valve 54 | Closed | Closed | Closed | Closed | Open | Open. |

While this system involves an intermittent flow of influent upwardly through zone 22 of bed 12 and an intermittent downflow or discharge of clogged or spent bed material through valve 20, it was found that in certain trial arrangements employing this invention, the upward flow of influent continued for periods ranging from 20 to 180 minutes, but the down time of the system during discharge lasted no more than one minute. Thus, because of the very brief interruptions this system can be considered essentially continuous with respect to liquid treatment.

AUTOMATIC CONTROL OF THE OPERATION

Valves 70, 20, 26, 54 and 76 and pumps 16, 36 and 74 could be controlled either manually or automatically by electrical circuitry of types familar to those skilled with such circuitry. For example, the bed discharge and replenishment operation may be initiated by a schematically shown pressure switch 57 connected to supply pipe 14. When the bed is in a relatively unclogged condition, the liquid from inlet openings 18 will readily flow upwardly through zone 22, and the pressure in supply pipe 14 will be relatively low. However, as the bed becomes clogged with extracted solids, the liquid pressure will build up in the space adjacent to openings 18 and in the supply pipe 14. The increased pressure in supply pie 14 will cause pressure switch 57 to be operated.

Operation of pressure switch 57 may cause a programmed stepping switch or a programmed series of timers designated 58, to operate the valves and pumps for the purpose of discharging and replenishing the bed materials. As an example, the following sequential steps are given for the case where bed discharge is produced during pressurization with the recycle alone, and bed addition is performed during normal operation:

(1) Pump 16 is de-energized;
(2) Valve 70 is closed;
(3) Valve 26 is closed;
(4) Valve 20 is opened;
(5) Valve 20 is closed;
(6) Valve 26 is opened;
(7) Pump 16 is energized;
(8) Valve 70 is opened;
(9) Valve 54 is opened;
(10) Valve 54 is closed.

The closing of valve 54 can be controlled by a bed level sensor 68 which maintains valve 54 in the open position until sufficient bed material has been added to bed 12 to restore surface 42 to its original position before the discharge of spent bed materials.

The automatic apparatus and method has been described for the filtration of suspended solids from a liquid influent. In other applications such as adsorption or ion exchange processes, operation of the apparatus would be identical except that bed replenishment would be periodically required because of the depletion of the adsorption or ion exchange capacity of the bed materials indicated by, for example, a deterioration of the product quality rather than because of an increase in pressure as is the case of filtration. Automatic bed discharge and replenishment could be initiated by a signal sent from an effluent analyzer. Alternatively, the initiation of bed removal could be controlled by a timer which may be set for any desired interval between bed removal periods. It could also be initiated by a meter which measured the quantity of liquid pumped into the column by pump 16.

ADVANTAGEOUS FEATURES OF THE INVENTION

This invention has two principal features. One is the use of hydraulic means (the recycle flow) to prevent fluidization of the bed particles, thereby maintaining the bed in a compact condition. The other is the creation of a pressure differential between the vessel housing the bed and a region outside the bed, said differential pressure being used to periodically force spent particles of the bed to move countercurrent to the direction of the influent flow and out of the vessel.

These two features make this invention applicable to all liquid solids contact processes for the purpose of mass transfer between the liquid and the solids, in addition to filtration. Maintenance of a compact bed is advantageous because the efficiency of mass transfer in a compact bed is superior to that achieved in a fluidized bed. Countercurrent movement of the bed solids is advantageous because it permits maximum utilization of the treatment capacity of the solids. Thus, although this invention was described primarily for the filtration of liquid wastes moving through beds of powdered coal, it is useful for such other operations, as the filtration of water flowing through beds of sand, the adsorption of dissolved organic compounds from water, liquid wastes and process liquids by activated carbon, the softening or demineralization of water by ion exchange resins and the extraction of oils from soybeans and from cottonseed, and other like processes which will be apparent to these skilled in the art.

EXAMPLES (1) Raw sewage was passed through a bed of +16 to +100 mesh high volatile C bituminous coal 4 feet high 3″ diameter. The sewage flowed upwardly through the bottom two feet of the bed at a rate of 30 gallons per hour per square foot of cross section. The recycle flowed downward through the top two feet of the bed at a rate of 60 gallons per hour per square foot of cross section. Periodically, spent coal was removed from the column by shutting off the influent flow, closing the influent and effluent valves, pressurizing the column to 110 inches of water measured at the bottom of the column, and opening the bottom discharge valve. The operation was conducted for 12 consecutive hours each day for 15 days. Suspended solids removal averaged 86.3 percent, chemical oxygen demand removal averaged 63.8 percent and coal wastage averaged 26.5 pounds per thousand gallons of sewage treated.

(2) A food processing waste was passed through an 8 foot high ¾″ diameter bed of high volatile C bituminous coal. The waste was passed upwardly through the lower 4 feet of the column at a rate of 30 gallons per square foot per hour. The recycle was passed downward through the upper 4 feet of the column at 60 gallons per square foot per hour. Preiodically, spent coal was removed from the column by shutting off the influent flow, closing the influent and effluent valves, pressurizing the column to 110 inches of water measured at the bottom of the column, and opening the bottom discharge valve. The run was divided into 2 sections. In each section, the waste was pumped through the column for 12 consecutive hours each day for 4 consecutive days. During the first period, the column was packed with −16 to +100 mesh coal. During the second period −16 to +40 mesh coal was used. With −16 to +100 mesh coal, suspended solids removal averaged 94 percent, chemical oxygen demand removal averaged 64 percent and coal use averaged 81.5 pounds per 1,000 gallons of waste treated. When −16 to +40 mesh coal was used, suspended solids removal averaged 91 percent, chemical oxygen demand removal averaged 64.5 percent, and coal use averaged 47.75 pounds per 1,000 gallons of waste treated.

While this invention has been shown and described with respect to certain embodiments merely for the purpose of illustration, and explanation it will be understood that the features and general principles of this invention may be applied to other and widely varied organizations as will be apparent to those skilled in the art, without departing from the spirit of the invention and from the scope of the appended claims.

What is claimed is:

1. The method of treating a liquid, which consists in passing the liquid to be treated upwardly through a bed of material, withdrawing treated liquid from said bed before it has reached the upper surface of said bed, pumping some of the treated liquid onto the top of said bed so as to maintain a downward pressure within said bed to prevent fluidization of said bed, and periodically and automatically applying additional pressure within said bed which is greater than the pressure at a point exterior to the bed at which material may be discharged from the bed.

2. The treating method of claim 1, which also comprises intermittently withdrawing material from the bottom of the bed and intermittently reinserting new material to the top of the bed.

3. The method of claim 2 which also consists in intermittently withdrawing material from the bottom of the bed in response to the applied pressure within the bed.

4. The method of treating a liquid, which consists in passing the liquid to be treated upwardly through a bed of material so that the treated liquid may be withdrawn from said bed, pumping some of the treated liquid onto the surface of said bed and establishing a substantial pressure throughout said bed so as to prevent fluidization of said bed, and regularly and automatically driving material out of the bottom of said bed in response to an external pressure within the bed.

5. The method of claim 4 in which the treated liquid is withdrawn from the bed before it has reached the upper surface of the bed.

6. The method of operating a liquid treating plant, which consists in transmitting the liquid to be treated upwardly through a bed of material, feeding some of the treated liquid to the top of the bed so that the treated liquid flows downwardly in the bed, receiving at a common intermediate point between the top and the bottom of the bed both upwardly flowing liquid and downwardly flowing liquid, and periodically and automatically applying additional pressure within the bed which is greater than the pressure at an outlet external the bed to which material within the bed may be discharged.

7. The method of claim 6 in which bed material is intermittently discharged from the bottom of the bed and new bed material is intermittently supplied to the top of the bed.

8. The method of claim 7 in which the pressure applied within the bed is substantially above atmospheric pressure and the pressure at the outlet is substantially equal to atmospheric pressure.

9. The method of claim 6 in which the feeding step is accomplished by pressure applied to the treated liquid introduced into the bed and, in addition, bed material is discharged from the bed in response to said pressure aided by a vacuum created at the bottom of the bed.

10. The method of treating a liquid comprising the steps of passing the liquid upwardly through the lower portion of a confined bed of material; withdrawing the liquid from said bed before it has reached the bed upper surface; pumping at least a portion of the withdrawn liquid back onto said bed at a point well above the withdrawal point to maintain said bed in a compacted condition; and periodically replenishing the bed material as its treating usefulness decreases; said replenishing step comprising the component steps of removing spent material from the bed lower surface and adding new material to the bed upper surface; said removing step including the step of applying an external pressure in regular sequence throughout said bed and, in response to said pressure, driving some of said bed material away from the bed.

11. The method of claim 10 and further comprising the step of sensing variations the liquid pressure in the bed, and removing spent bed material in response to the sensed pressure variations.

12. The method of claim 11 and further comprising the step of sensing variations in the upper surface level of the bed, and in response to the sensed variations controlling the step of adding new bed material to the bed upper surface.

13. The method of claim 10 wherein the bed is confined within a vessel having a valve in its lower wall; said step of removing spent bed material being carried out by opening said valve and in response to pressure within the bed, moving the bed downwardly in the direction of said valve to force spent bed material therethrough.

14. The method of claim 13 wherein the step of withdrawing liquid from the bed is carried out with said valve in a closed condition.

15. Liquid treating apparatus comprising a liquid treatment bed comprising material in the form of a confined mass of solid closely packed particles; liquid inlet means operable to feed raw liquid into a lower portion of said bed; valved liquid outlet means located part way up the height of said bed, whereby the liquid flows from the inlet means upwardly through said bed and out of the bed before reaching said bed upper surface; a liquid reintroduction port means located at a point in said bed above the liquid outlet means; means including a pump for recycling liquid from the outlet means to the reintroduction port means to maintain said bed in a compacted condition; and means for periodically exhausting some of the bed material, said latter means comprising means for communicating the bed material with an atmosphere of a pressure less than the pressure within said bed, and means for periodically replenishing the exhausted bed material; said replenishing means including mechanism for automatically and concurrently energizing the pump to create a uniform pressure within said bed and restricting the escape of liquid from said bed, whereby the pressure within said bed tends to move the entire bed downwardly from its normal position.

16. The apparatus of claim 15 wherein the replenishing mechanism includes a control means responding to variations in pressure within the bed to trigger the mechanism.

17. The apparatus of claim 16 wherein the replenishing mechanism comprises means for adding new bed material to the upper surface of the bed, and means responsive to variations in upper bed surface level for controlling the adding means.

(References on following page)

References Cited

UNITED STATES PATENTS

| | | | |
|---|---|---|---|
| 2,057,887 | 10/1936 | Elliott et al. | 210—268 X |
| 2,632,720 | 3/1953 | Perry | 210—19 X |
| 2,801,966 | 8/1957 | Mertes et al. | 210—268 X |
| 3,282,426 | 11/1966 | Entringer | 210—189 X |

JOHN W. ADEE, Primary Examiner

U.S. Cl. X.R.

210—104, 106, 138, 189, 196, 268, 269, 277